(12) United States Patent
Tiri et al.

(10) Patent No.: US 9,607,153 B2
(45) Date of Patent: Mar. 28, 2017

(54) APPARATUS AND METHOD FOR DETECTING CLOCK TAMPERING

(71) Applicant: QUALCOMM Incorporated, San Diego, CA (US)

(72) Inventors: Kris Tiri, San Diego, CA (US); Matthew Scott McGregor, Huntington Beach, CA (US); Yucong Tao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 13/801,375

(22) Filed: Mar. 13, 2013

(65) Prior Publication Data
US 2014/0281643 A1   Sep. 18, 2014

(51) Int. Cl.
| | |
|---|---|
| G06F 11/30 | (2006.01) |
| G06F 1/00 | (2006.01) |
| H04L 29/06 | (2006.01) |
| G06F 11/00 | (2006.01) |
| G06F 21/57 | (2013.01) |

(Continued)

(52) U.S. Cl.
CPC ............... *G06F 21/57* (2013.01); *G06F 1/04* (2013.01); *G06F 1/06* (2013.01); *G06F 11/076* (2013.01); *G06F 11/0721* (2013.01); *G06F 21/725* (2013.01); *G06F 21/00* (2013.01); *G06F 21/55* (2013.01); *G06F 21/602* (2013.01); *G06F 21/70* (2013.01); *G06F 21/71* (2013.01)

(58) Field of Classification Search
None
See application file for complete search history.

(56) References Cited

U.S. PATENT DOCUMENTS

| | | | |
|---|---|---|---|
| 7,233,182 B1 * | 6/2007 | Savoj | ........................... 327/141 |
| 7,924,061 B2 | 4/2011 | Guillot et al. | |

(Continued)

FOREIGN PATENT DOCUMENTS

| | | |
|---|---|---|
| EP | 0233221 A1 | 8/1987 |
| GB | 2281794 A | 3/1995 |
| WO | WO-2004092932 A1 | 10/2004 |

OTHER PUBLICATIONS

Fan J et al., "State-of-the-art of Secure ECC Implementations: A Survey on Known Side Channel Attacks and Counter Measures", IEEE International Symposium on Hardware-Oriented Security and Trust (HOST) 2010, pp. 76-87.

(Continued)

*Primary Examiner* — Ji H Bae
(74) *Attorney, Agent, or Firm* — Loza & Loza, LLP

(57) ABSTRACT

Disclosed is a method for detecting clock tampering. In the method a plurality of resettable delay line segments are provided. Resettable delay line segments between a resettable delay line segment associated with a minimum delay time and a resettable delay line segment associated with a maximum delay time are each associated with discretely increasing delay times. A monotone signal is provided during a clock evaluate time period associated with a clock. The monotone signal is delayed using each of the plurality of resettable delay line segments to generate a respective plurality of delayed monotone signals. The clock is used to trigger an evaluate circuit that uses the plurality of delayed monotone signals to detect a clock fault.

43 Claims, 5 Drawing Sheets

(51) Int. Cl.
    *G06F 1/06*     (2006.01)
    *G06F 1/04*     (2006.01)
    *G06F 11/07*     (2006.01)
    *G06F 21/72*     (2013.01)
    *G06F 21/55*     (2013.01)
    *G06F 21/00*     (2013.01)
    *G06F 21/70*     (2013.01)
    *G06F 21/60*     (2013.01)
    *G06F 21/71*     (2013.01)

(56) References Cited

U.S. PATENT DOCUMENTS

| | | | |
|---|---|---|---|
| 7,971,105 B2 | 6/2011 | Rozen et al. | |
| 2002/0017981 A1* | 2/2002 | Turner | G06K 7/0008 340/10.34 |
| 2007/0274434 A1* | 11/2007 | Arkas et al. | 377/94 |
| 2008/0080658 A1* | 4/2008 | Huang | H03L 7/095 375/376 |
| 2010/0109721 A1* | 5/2010 | Fuller | G06F 1/24 327/142 |
| 2010/0327913 A1 | 12/2010 | Trimmer | |
| 2011/0175657 A1 | 7/2011 | Chong et al. | |
| 2011/0299678 A1 | 12/2011 | Deas et al. | |
| 2013/0238262 A1* | 9/2013 | Asami | G01R 31/31706 702/58 |
| 2015/0109461 A1* | 4/2015 | Ahuja | H04N 17/002 348/187 |

OTHER PUBLICATIONS

Halderman J.A. et al., "Lest We Remember: Cold Boot Attacks on Encryption Keys", USENIX Security Symposium Proc. Feb. 21, 2008, pp. 1-16.

Kommerling O., et al., "Design Principles for Tamper-Resistant Smartcard Processors," Usenix Workshop on Smartcard Technology, Smartcard '99 Conference, May 10-11, 1999, 13 pages.

Trusted Computing Group, "TCG Platform Reset Attack Mitigation Specification", May 15, 2008, pp. 1-15.

Vater F et al., "Combinatorial Logic Circuitry as Means to Protect Low Cost Devices Against Side Channel Attacks", WISTP, 2007, pp. 1-10.

International Search Report and Written Opinion—PCT/US2014/022655—ISA/EPO—Jul. 17, 2014.

Peter S., "Web Site Peter Steffen with List of Publications including Publication Date", Jan. 1, 2010 (Jan. 1, 2010), pp. 1-7, XP055127627, Retrieved from the Internet: URL:http://www.ics.uci.edu/~steffenp/[retrieved on Jul. 8, 2014] p. 5 Publication [6].

Vater F., et al., "An On-chip Security Monitoring Solution for System Clock for Low Cost Devices", 3rd Workshop on Embedded Systems Security (WESS '2008)—A Workshop of the IEEE/ACM EMSOFT '2008 and the Embedded Systems Week, 2008, Oct. 23, 2008 (Oct. 23, 2008), pp. 1-6, XP055127626, Retrieved from the Internet: URL: http://www.ics.uci.edu/-steffenp/files/WESS vater.pdf [retrieved on Jul. 8, 2014] the whole document.

* cited by examiner

APPARATUS AND METHOD FOR DETECTING CLOCK TAMPERING

BACKGROUND

Field

The present invention relates generally to detecting tampering with the clock and/or supply voltage of a processor.

Background

A cryptographic computation of a computation system may be attacked by causing a temporary spike (or glitch) on a clock and/or power supply voltage to introduce faults into the computation results. Also, an attack may increase the clock frequency to sufficiently shorten a computation period such that the wrong value of an incomplete computation is sampled in the registers of the computation system. In addition, an attack may slow down the bus of the computation system to more easily attack the system.

There is therefore a need for a technique for detecting tampering with the clock and/or supply voltage of a processor in an efficient and cost-effective manner.

SUMMARY

An aspect of the present invention may reside in a method for detecting clock tampering. In the method a plurality of resettable delay line segments are provided. Resettable delay line segments between a resettable delay line segment associated with a minimum delay time and a resettable delay line segment associated with a maximum delay time are each associated with discretely increasing delay times. A monotone signal is provided during a clock evaluate time period associated with a clock. The monotone signal is delayed using each of the plurality of resettable delay line segments to generate a respective plurality of delayed monotone signals. The clock is used to trigger an evaluate circuit that uses the plurality of delayed monotone signals to detect a clock fault.

In more detailed aspects of the invention, the method may further include resetting the resettable delay line segments during a reset time period. The reset time period may be prior to the clock evaluate time period. Using the clock to trigger the evaluate circuit may use a clock edge at an end of the clock evaluate time period to trigger the evaluate circuit.

In other more detailed aspects of the invention, each of the plurality of delayed monotone signals may be either a one or a zero. The evaluate circuit may determine whether the number of ones in the plurality of delayed monotone signals differs from a water level number by more than a predetermined threshold. The water level number may be determined based on delayed monotone signals from one or more previous clock evaluate time. The plurality of resettable delay line segments may comprise taps along a delay line. Alternatively, the plurality of resettable delay line segments comprises parallel delay lines.

Another aspect of the invention may reside in an apparatus for detecting clock tampering, comprising: means for providing a monotone signal during a clock evaluate time period associated with a clock; means for delaying the monotone signal using a plurality of resettable delay line segments to generate a respective plurality of delayed monotone signals having discretely increasing delay times between a minimum delay time and a maximum delay time; and means for using the clock to trigger an evaluate circuit that uses the plurality of delayed monotone signals to detect a clock fault.

Another aspect of the invention may reside in an apparatus for detecting clock tampering, comprising a circuit that provides a monotone signal, a plurality of resettable delay line segments, and an evaluate circuit. The circuit provides the monotone signal during a clock evaluate time period associated with a clock. The plurality of resettable delay line segments delay the monotone signal to generate a respective plurality of delayed monotone signals. Resettable delay line segments between a resettable delay line segment associated with a minimum delay time and a resettable delay line segment associated with a maximum delay time are each associated with discretely increasing delay times. The evaluate circuit is triggered by the clock and uses the plurality of delayed monotone signals to detect a clock fault.

Another aspect of the invention may reside in an apparatus for detecting clock tampering, comprising: first circuit, a first plurality of resettable delay line segments, a second circuit, a second plurality of resettable delay line segments, and an evaluate circuit. The first circuit provides a first monotone signal during a first clock evaluate time period associated with a clock. The first plurality of resettable delay line segments each delay the first monotone signal to generate a respective first plurality of delayed monotone signals. Resettable delay line segments between a resettable delay line segment associated with a minimum delay time and a resettable delay line segment associated with a maximum delay time are each associated with discretely increasing delay times. The second circuit provides a second monotone signal during a second clock evaluate time period associated with the clock. The second clock evaluate time period covers a different time than the first clock evaluate time period. The second plurality of resettable delay line segments each delay the first monotone signal to generate a respective second plurality of delayed monotone signals. Resettable delay line segments between a resettable delay line segment associated with a minimum delay time and a resettable delay line segment associated with a maximum delay time are each associated with discretely increasing delay times. The evaluate circuit is triggered by the clock and uses the first plurality of delayed monotone signals or the second plurality of delayed monotone signals to detect a clock fault.

An aspect of the present invention may reside in a method for detecting voltage tampering. In the method, a plurality of resettable delay line segments are provided. Resettable delay line segments between a resettable delay line segment associated with a minimum delay time and a resettable delay line segment associated with a maximum delay time are each associated with discretely increasing delay times. A monotone signal is provided during an evaluate time period. The monotone signal is delayed using each of the plurality of resettable delay line segments to generate a respective plurality of delayed monotone signals. A clock is used to trigger an evaluate circuit that uses the plurality of delayed monotone signals to detect a voltage fault.

In more detailed aspects of the invention, the method may further include resetting the resettable delay line segments during a reset time period. The reset time period may be prior to the evaluate time period. Using the clock to trigger the evaluate circuit may use a clock edge at an end of the evaluate time period to trigger the evaluate circuit.

In other more detailed aspects of the invention, each of the plurality of delayed monotone signals comprises either a one or a zero. The evaluate circuit may determine whether the number of ones in the plurality of delayed monotone signals differs from a water level number by more than a predetermined threshold. The water level number may be determined based on delayed monotone signals from one or more previous evaluate time. The plurality of resettable delay line segments may comprise taps along a delay line. Alternatively, the plurality of resettable delay line segments comprises parallel delay lines.

Another aspect of the invention may reside in an apparatus for detecting voltage tampering, comprising: means for providing a monotone signal during an evaluate time; means for delaying the monotone signal using a plurality of resettable delay line segments to generate a respective plurality of delayed monotone signals having discretely increasing delay times between a minimum delay time and a maximum delay time; and means for using the clock to trigger an evaluate circuit that uses the plurality of delayed monotone signals to detect a voltage fault.

Another aspect of the invention may reside in an apparatus for detecting voltage tampering, comprising a circuit that provides a monotone signal, a plurality of resettable delay line segments, and an evaluate circuit: The circuit provides a monotone signal during an evaluate time period. The plurality of resettable delay line segments delay the monotone signal to generate a respective plurality of delayed monotone signals. Resettable delay line segments between a resettable delay line segment associated with a minimum delay time and a resettable delay line segment associated with a maximum delay time are each associated with discretely increasing delay times. An evaluate circuit is triggered by a clock and uses the plurality of delayed monotone signals to detect a voltage fault.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
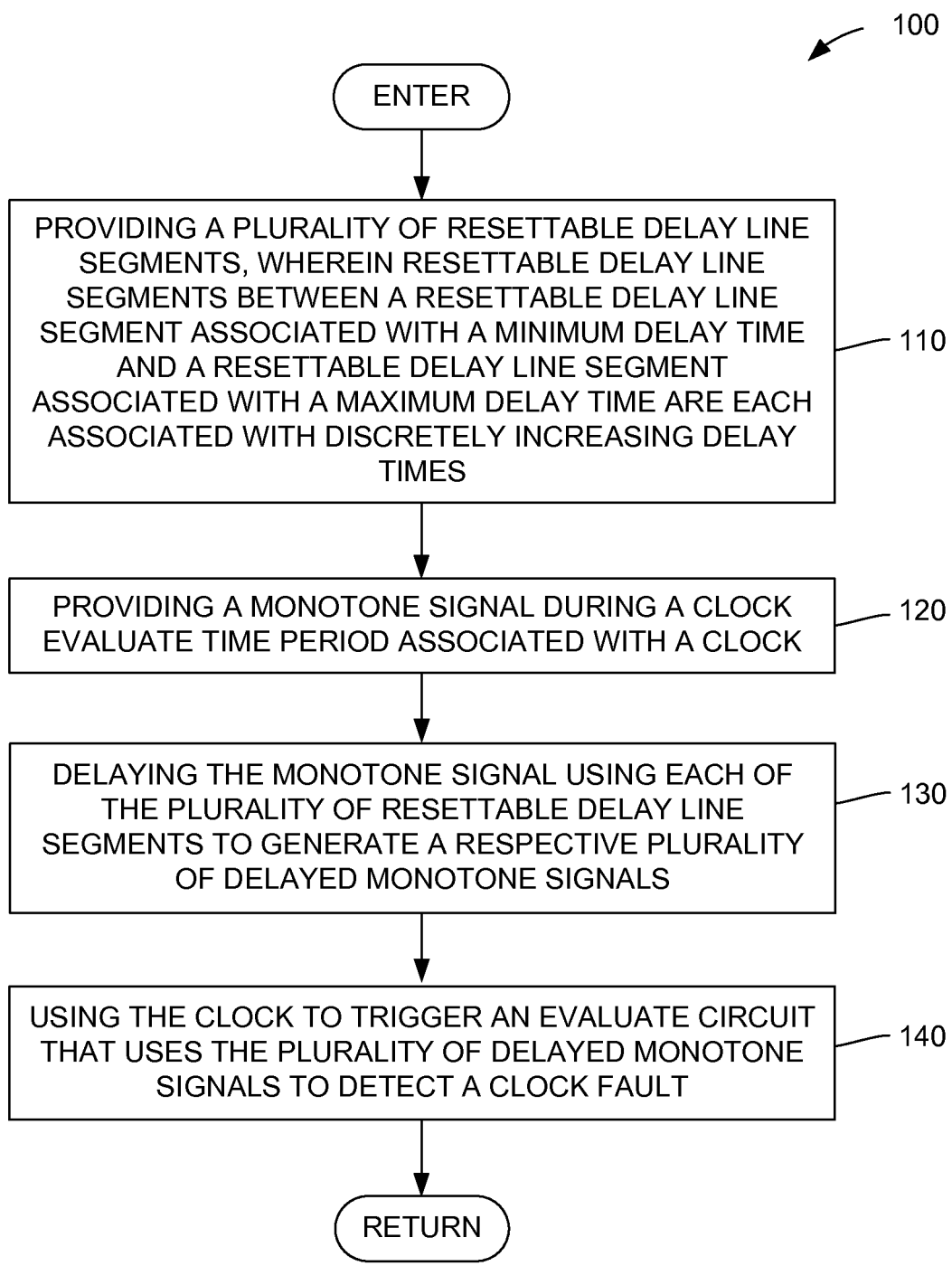
FIG. 1 is a flow diagram of a method for detecting clock tampering, according to the present invention.
Figure 2:
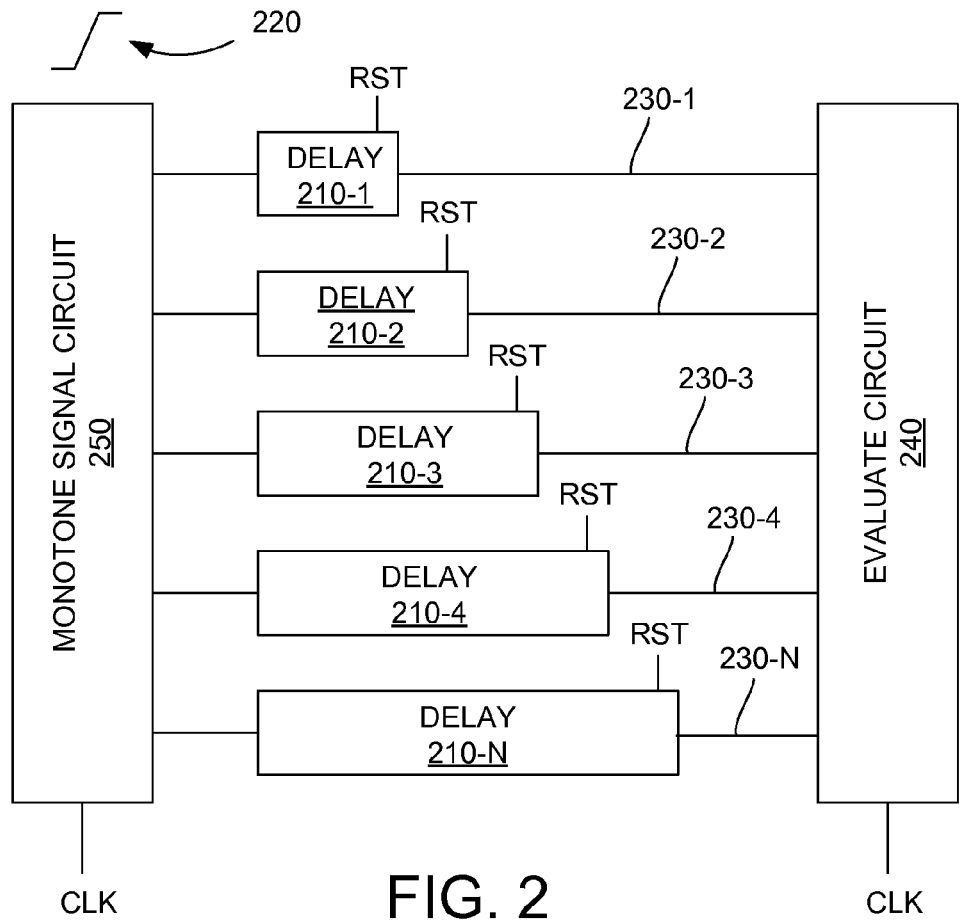
FIG. 2 is a block diagram of an apparatus for detecting clock tampering or voltage tampering.
Figure 3:
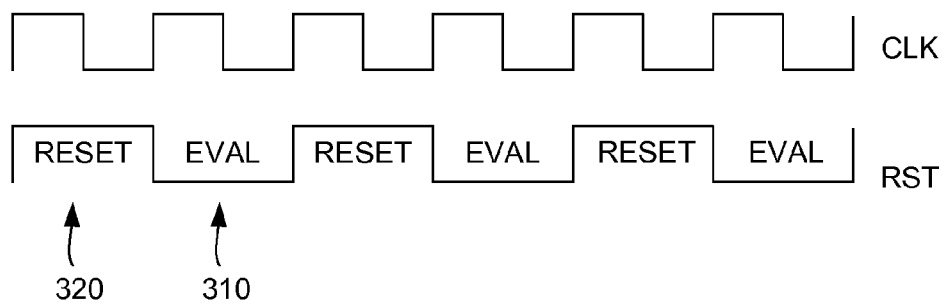
FIG. 3 is a schematic diagram of a clock signal and a reset signal.

With reference to FIGS. 1, 2 and 3, an aspect of the present invention may reside in a method 100 for detecting clock tampering. In the method, a plurality of resettable delay line segments 210 are provided (step 110). Resettable delay line segments between a resettable delay line segment 210-1 associated with a minimum delay time and a resettable delay line segment 210-N associated with a maximum delay time are each associated with discretely increasing delay times. A monotone signal 220 is provided during a clock evaluate time period 310 associated with a clock CLK (step 120). The monotone signal is delayed using each of the plurality of resettable delay line segments to generate a respective plurality of delayed monotone signals 230 (step 130). The clock is used to trigger an evaluate circuit 240 that uses the plurality of delayed monotone signals to detect a clock fault (step 140).

In more detailed aspects of the invention, the method 100 may further include resetting the resettable delay line segments 210 using a reset signal RST during a reset time period 320. The reset time period may be prior to the clock evaluate time period 310. Using the clock CLK to trigger the evaluate circuit 240 may use a clock edge at an end of the clock evaluate time period to trigger the evaluate circuit.

In other more detailed aspects of the invention, each of the plurality of delayed monotone signals 230 may be either a one or a zero. The evaluate circuit 240 may determine whether the number of ones in the plurality of delayed monotone signals differs from a water level number by more than a predetermined threshold. The water level number may be determined based on delayed monotone signals from one or more previous clock evaluate time 310.

Figure 4:
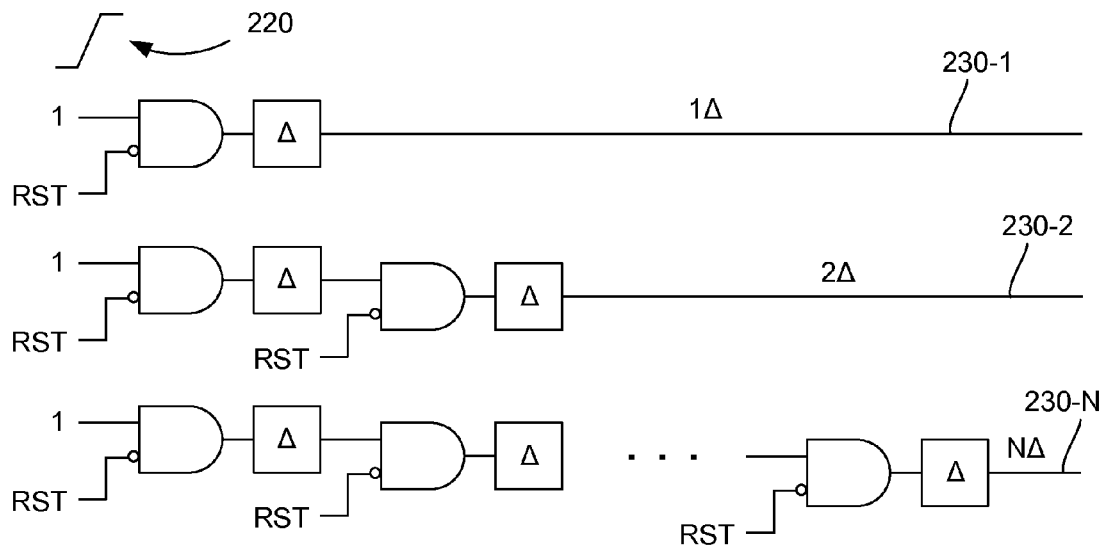
FIG. 4 is a schematic diagram of delay line segments in parallel.

With reference to FIG. 4, the plurality of resettable delay line segments 210 may comprise parallel segmented delay lines. One delay line segment may have just one delay element that generates the minimum delayed monotone signal. Another delay line segment may have N delay elements that generate the maximum delayed monotone signal 230-N. AND gates in the delay lines may each have a reset input RST to reset the line between the delay elements to set the delay line to an initial known state.

Figure 5:
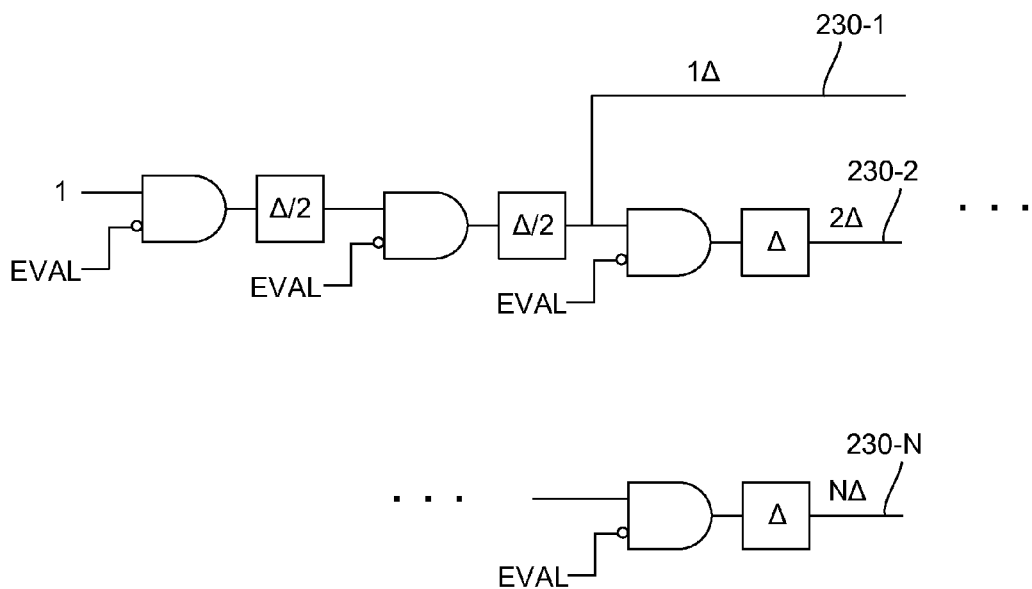
FIG. 5 is a schematic diagram of delay line segments in serial.

With reference to FIG. 5, the plurality of resettable delay line segments 310 may comprise taps along a delay line. The segmented delay line may have taps along the line to generate the respective delayed monotone signals 230. An evaluate signal EVAL may reset the line segments using an AND gate between the delay elements. The evaluate signal may be formed from the clock signal CLK, e.g., one-half the clock signal.

Figure 6:
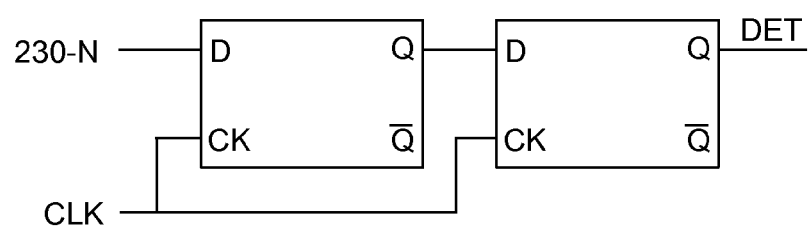
FIG. 6 is a schematic diagram of a detect circuit in an evaluate circuit.

With reference to FIG. 6, the evaluate circuit may use detection circuits each having a flip-flop or pair of flip-flops to latch, responsive to the clock, the respective delayed monotone signal 230-N for each resettable delay line segment.

The monotone 0 to 1 transition may be achieved by introducing reset operators. Each reset operator may reset the respective delay line of the sensing circuit during the reset phase to a known state independent of any setup-violations, while the circuit senses during the evaluation phase. Without the reset operators, the sensing circuit that detects slower than expected frequencies may be in an unknown state. There are several ways to implement the reset operator. As shown in FIGS. 4 and 5, AND-gates may be inserted in the delay line(s). One input of the AND gate may be driven by the monotone 0 to 1 signal, and the other input may be driven by the negated reset signal. Each AND-gate allows its part of the delay line to be reset within the reset period, while propagating the monotone 0 to 1 signal during the evaluate period.

The technique of the invention may detect faster- and slower-than-expected clock frequencies. It also may detect a setup-time violation of the monotone signal to sense faster than expected frequencies or glitches. A substantial change in the number of setup-time violations may be detected to provide an adaptive environment insensitive sensor. A small difference due to normal environmental changes such as temperature will be within a predetermined detection threshold. A large difference in violations due to tampering (frequency and/or voltage) will be outside of the predetermined detection threshold.

A no-clock-present condition may be detected when the circuit with the longest propagation delay is triggered. This trigger may either be used by asynchronous circuits to react immediately or a state bit can be set for the system to react later when the clock comes back on.

Very high steady state frequency detection depends on the delay between the reset operators of the shortest delay line. The shorter the time required to reset this delay line, the shorter the time actually allocated to reset the delay line may be. The delay between the reset operators of the other sensing circuits may be less stringent and may be determined by the highest acceptable operating frequency.

Several techniques may be used to detect whether the number of changing setup violations is significant. One way is to XOR the state of each detection circuit with the previous state of the circuit and to compare the number of '1's with a threshold. Another way is to determine the particular detection circuit that corresponds with the expected frequency using STA (static timing analysis) or during a calibration phase. This particular circuit acts as a water level: circuits associated with shorter delay lines will measure a '0' while circuits associated with longer delay lines will measure a '1'. A high water level mark and a low level mark may serve as a trigger.

Note that several variations can easily be implemented. As an example, the detection/sensing circuit may depend on a monotone 1 to 0 transition and the circuit may be reset to 1. As another example, the circuit may interleave monotone 1 to 0 and 0 to 1 transitions. As another example, the reset operator may be implemented with a MUX that based on the reset signal chooses between the monotone signal and the reset value. As another example, the delay line may be made up of buffers, paired invertors or any circuit that guarantees a monotone signal transition. As another example, the no-clock detection may be omitted. As another example, the 'fast'-line (or any other line) may be sampled at end of a reset-phase to confirm that the circuit has been fully reset. As another example, the detection circuit may be reduced to have only 2 delay line segments, one corresponding to the high water mark, another to the low water mark.

Another aspect of the invention may reside in an apparatus for detecting clock tampering, comprising: means 250 for providing a monotone signal 220 during a clock evaluate time period 310 associated with a clock CLK; means 210 for delaying the monotone signal using a plurality of resettable delay line segments to generate a respective plurality of delayed monotone signals 230 having discretely increasing delay times between a minimum delay time and a maximum delay time; and means 240 for using the clock CLK to trigger an evaluate circuit 240 that uses the plurality of delayed monotone signals to detect a clock fault.

Another aspect of the invention may reside in an apparatus for detecting clock tampering, comprising a circuit 250 that provides a monotone signal 220, a plurality of resettable delay line segments 210, and an evaluate circuit 240. The circuit 250 provides the monotone signal during a clock evaluate time period 310 associated with a clock CLK. The plurality of resettable delay line segments delay the monotone signal to generate a respective plurality of delayed monotone signals 230. Resettable delay line segments between a resettable delay line segment 210-1 associated with a minimum delay time and a resettable delay line segment 210-N associated with a maximum delay time are each associated with discretely increasing delay times. The evaluate circuit 240 is triggered by the clock CLK and uses the plurality of delayed monotone signals to detect a clock fault.

Clock-signals with uneven duty cycles may be detected by using dual circuits: one driven by the clock signal and another driven by the negated clock signal. Without the dual circuits, the frequency can be slowed down undetectably by increasing the reset period but keeping the evaluation period constant. With the dual circuit approach, one circuit will be guaranteed to be in the evaluate phase during this long time interval.

Figure 7:
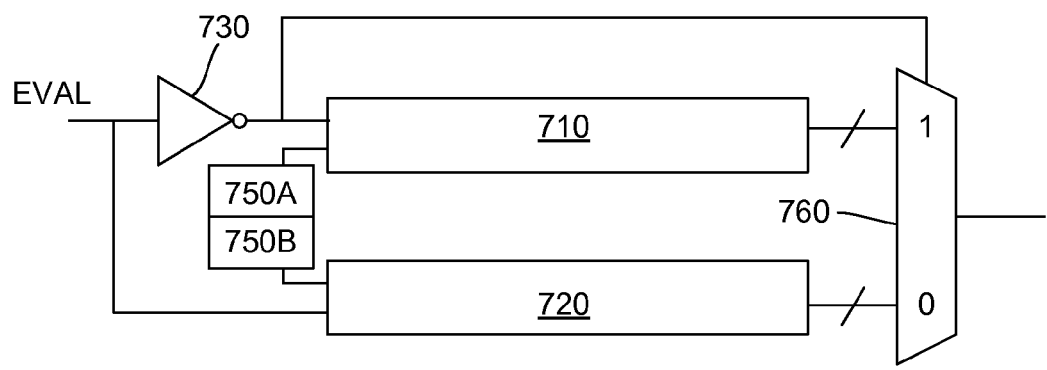
FIG. 7 is a schematic diagram of a circuit having dual delay lines for detecting a clock having an uneven duty cycle.

With further reference to FIG. 7, another aspect of the invention may reside in an apparatus for detecting clock tampering, comprising: a first circuit 750A, a first plurality of resettable delay line segments 710, a second circuit 750B, a second plurality of resettable delay line segments 720, and an evaluate circuit 240. The first circuit provides a first monotone signal during a first clock evaluate time period associated with a clock. The first plurality of resettable delay line segments each delay the first monotone signal to generate a respective first plurality of delayed monotone signals. Resettable delay line segments between a resettable delay line segment associated with a minimum delay time and a resettable delay line segment associated with a maximum delay time are each associated with discretely increasing delay times. The second circuit provides a second monotone signal during a second clock evaluate time period associated with the clock. The second clock evaluate time period covers a different time than the first clock evaluate time period, as may be enforced by an inverter 730. The second plurality of resettable delay line segments each delay the second monotone signal to generate a respective second plurality of delayed monotone signals. Resettable delay line segments between a resettable delay line segment associated with a minimum delay time and a resettable delay line segment associated with a maximum delay time are each associated with discretely increasing delay times. The evaluate circuit is triggered by the clock (e.g., EVAL) and uses the first plurality of delayed monotone signals or the second plurality of delayed monotone signals to detect a clock fault. A multiplexer 760 may select which of the first or second plurality of delayed monotone signals are active to be provided to the evaluate circuit.

The technique of the invention may be implemented based on combinatorial logic using static CMOS, which is relatively cost effective based the processor's existing circuit integration. Detection compensation for process, voltage, and temperature variations of the delay lines, may be achieved by adapting the number of delay lines and multi-frequency plan support. Voltage spikes used in a fault attack may be detected. These voltage spikes may decrease the voltage, slow down the circuit, and result in an incomplete computation being sampled in the registers. Alternatively, an increase in the voltage may speed up the circuit resulting in an unexpected computation or result being sampled in the registers.

Figure 8:
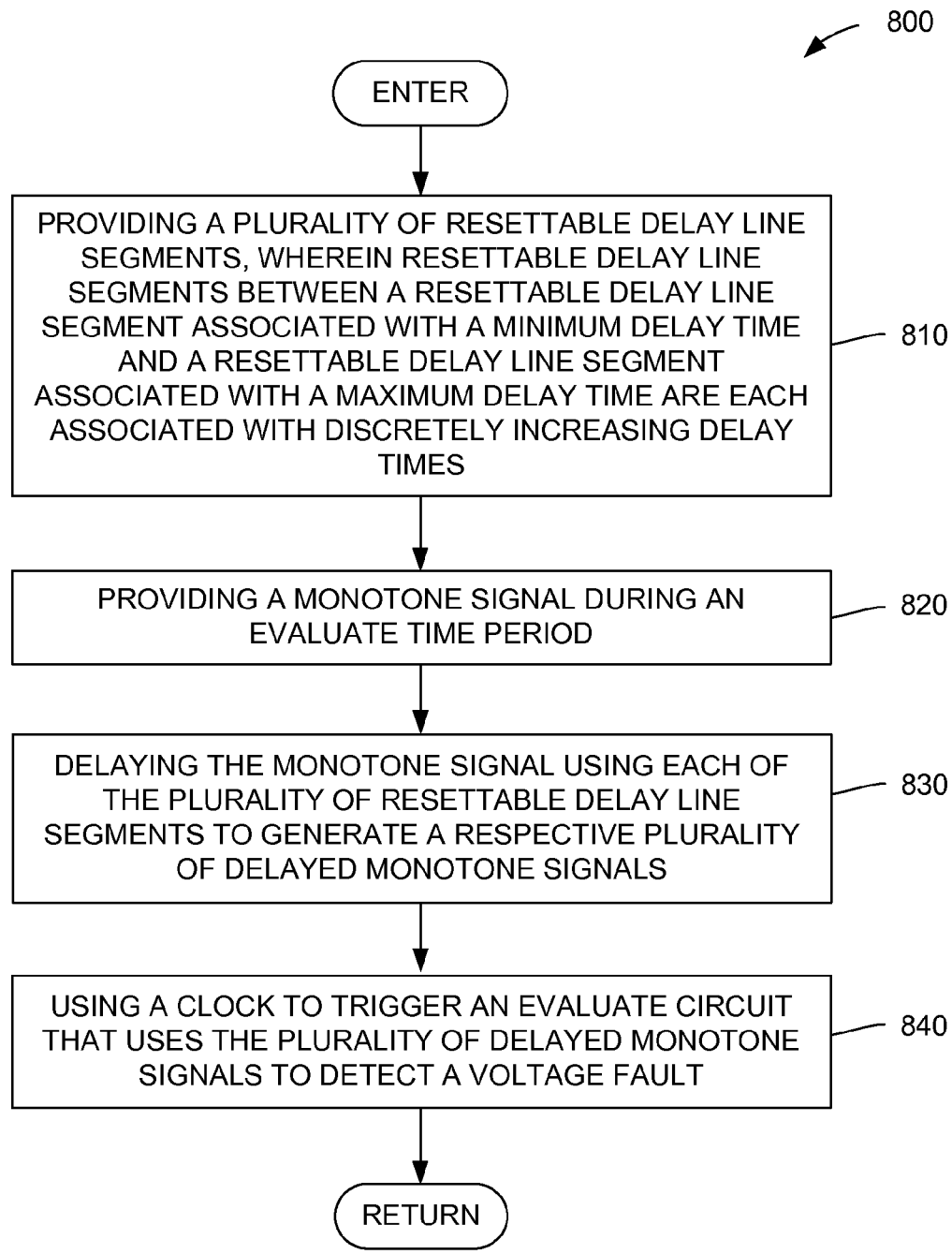
FIG. 8 is a flow diagram of a method for detecting voltage tampering, according to the present invention.

With reference to FIGS. 2, 3 and 8, another aspect of the present invention may reside in a method 800 for detecting voltage tampering. In the method, a plurality of resettable delay line segments 210 are provided (step 810). Resettable delay line segments between a resettable delay line segment 210-1 associated with a minimum delay time and a resettable delay line segment 210-N associated with a maximum delay time are each associated with discretely increasing delay times. A monotone signal 220 is provided during an evaluate time period 310 (step 820). The monotone signal is delayed using each of the plurality of resettable delay line segments to generate a respective plurality of delayed monotone signals 230 (step 830). A clock is used to trigger an evaluate circuit 240 that uses the plurality of delayed monotone signals to detect a voltage fault (step 840).

In more detailed aspects of the invention, the method 800 may further include resetting the resettable delay line segments 210 using a reset signal RST during a reset time period 320. The reset time period may be prior to the evaluate time period 310. Using the clock CLK to trigger the evaluate circuit 220 may use a clock edge at an end of the evaluate time period to trigger the evaluate circuit.

In other more detailed aspects of the invention, each of the plurality of delayed monotone signals 230 may comprise either a one or a zero. The evaluate circuit 240 may determine whether the number of ones in the plurality of delayed monotone signals differs from a water level number by more than a predetermined threshold. The water level number may be determined based on delayed monotone signals from one or more previous evaluate time 310. The plurality of resettable delay line segments may comprise taps along a delay line. Alternatively, the plurality of resettable delay line segments comprises parallel delay lines.

Another aspect of the invention may reside in an apparatus for detecting voltage tampering, comprising: means 250 for providing a monotone signal 220 during an evaluate time 310; means 210 for delaying the monotone signal using a plurality of resettable delay line segments to generate a respective plurality of delayed monotone signals 230 having discretely increasing delay times between a minimum delay time and a maximum delay time; and means 240 for using the clock to trigger an evaluate circuit 240 that uses the plurality of delayed monotone signals to detect a voltage fault.

Another aspect of the invention may reside in an apparatus for detecting voltage tampering comprising a circuit 250 that provides a monotone signal 220, a plurality of resettable delay line segments 210, and an evaluate circuit 240. The circuit 250 provides a monotone signal during an evaluate time period 310. The plurality of resettable delay line segments delay the monotone signal to generate a respective plurality of delayed monotone signals 230. Resettable delay line segments between a resettable delay line segment 210-1 associated with a minimum delay time and a resettable delay line segment 210-N associated with a maximum delay time are each associated with discretely increasing delay times. An evaluate circuit 240 is triggered by a clock CLK and uses the plurality of delayed monotone signals to detect a voltage fault.

The circuits disclosed throughout the above description may be included in a computing system such as a desktop or laptop computer, a tablet, a mobile device, a cellular telephone, etc. Those of skill would further appreciate that the various illustrative logical blocks, modules, circuits, and algorithm steps described in connection with the embodiments disclosed herein may be implemented as electronic hardware, or combinations of hardware and computer software. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be integrated with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, or in a combination of hardware and a software module executed by a processor. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a computing system/user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting clock tampering, comprising:
   providing a plurality of resettable delay line segments, wherein resettable delay line segments between a resettable delay line segment associated with a minimum delay time and a resettable delay line segment associated with a maximum delay time are each associated with discretely increasing delay times;
   providing a monotone signal during a clock evaluate time period associated with a clock;
   delaying the monotone signal using each of the plurality of resettable delay line segments to generate a respective plurality of delayed monotone signals each having either a one or a zero logic value; and
   using the clock to trigger an evaluate circuit that uses the plurality of delayed monotone signals to detect a clock fault.

2. The method for detecting clock tampering as defined in claim 1, further comprising:
   resetting the resettable delay line segments during a reset time period, wherein the reset time period is prior to the clock evaluate time period.

3. The method for detecting clock tampering as defined in claim 1, wherein using the clock to trigger the evaluate circuit comprises using a clock edge at an end of the clock evaluate time period to trigger the evaluate circuit.

4. The method for detecting clock tampering as defined in claim 1, wherein the evaluate circuit determines whether the number of ones in the plurality of delayed monotone signals differs from a water level number by more than a predetermined threshold.

5. The method for detecting clock tampering as defined in claim 4, wherein the water level number is determined based on delayed monotone signals from one or more previous clock evaluate time.

6. The method for detecting clock tampering as defined in claim 1, wherein the plurality of resettable delay line segments comprises taps along a delay line.

7. The method for detecting clock tampering as defined in claim 1, wherein the plurality of resettable delay line segments comprises parallel delay lines.

8. An apparatus for detecting clock tampering, comprising:
　means for providing a monotone signal during a clock evaluate time period associated with a clock;
　means for delaying the monotone signal to generate a plurality of delayed monotone signals having discretely increasing delay times between a minimum delay time and a maximum delay time and each of the plurality of delayed monotone signals having either a one or a zero logic value;
　means for evaluating that uses the plurality of delayed monotone signals to detect a clock fault and
　means for triggering the means for evaluating.

9. The apparatus for detecting clock tampering as defined in claim 8, further comprising:
　means for resetting the means for delaying the monotone signal during a reset time period, wherein the reset time period is prior to the clock evaluate time period.

10. The apparatus for detecting clock tampering as defined in claim 8, wherein the means for triggering the means for evaluating uses a clock edge at an end of the clock evaluate time period to trigger the means for evaluating.

11. The apparatus for detecting clock tampering as defined in claim 8, wherein-the means for evaluating determines whether the number of ones in the plurality of delayed monotone signals differs from a water level number by more than a predetermined threshold.

12. The apparatus for detecting clock tampering as defined in claim 11, wherein the water level number is determined based on delayed monotone signals from one or more previous clock evaluate time.

13. The apparatus for detecting clock tampering as defined in claim 8, wherein the means for delaying the monotone signal includes taps along a delay line.

14. The apparatus for detecting clock tampering as defined in claim 8, wherein the means for delaying the monotone signal includes parallel delay lines.

15. An apparatus for detecting clock tampering, comprising:
　a circuit that provides a monotone signal during a clock evaluate time period associated with a clock;
　a plurality of resettable delay line segments that delay the monotone signal to generate a respective plurality of delayed monotone signals each having either a one or a zero logic value, wherein resettable delay line segments between a resettable delay line segment associated with a minimum delay time and a resettable delay line segment associated with a maximum delay time are each associated with discretely increasing delay times; and
　an evaluate circuit, triggered by the clock, that uses the plurality of delayed monotone signals to detect a clock fault.

16. The apparatus for detecting clock tampering as defined in claim 15, wherein the resettable delay line segments are reset during a reset time period, wherein the reset time period is prior to the clock evaluate time period.

17. The apparatus for detecting clock tampering as defined in claim 15, wherein the evaluate circuit is triggered by a clock edge at an end of the clock evaluate time period.

18. The apparatus for detecting clock tampering as defined in claim 15, wherein the evaluate circuit determines whether the number of ones in the plurality of delayed monotone signals differs from a water level number by more than a predetermined threshold to detect a clock fault.

19. The apparatus for detecting clock tampering as defined in claim 18, wherein the water level number is determined based on delayed monotone signals from one or more previous clock evaluate time.

20. The apparatus for detecting clock tampering as defined in claim 15, wherein the plurality of resettable delay line segments comprises taps along a delay line.

21. The apparatus for detecting clock tampering as defined in claim 15, wherein the plurality of resettable delay line segments comprises parallel delay lines.

22. An apparatus for detecting clock tampering, comprising:
　a first circuit that provides a first monotone signal during a first clock evaluate time period associated with a clock;
　a first plurality of resettable delay line segments that each delay the first monotone signal to generate a respective first plurality of delayed monotone signals, wherein resettable delay line segments between a resettable delay line segment associated with a minimum delay time and a resettable delay line segment associated with a maximum delay time are each associated with discretely increasing delay times;
　a second circuit that provides a second monotone signal during a second clock evaluate time period associated with the clock, wherein the second clock evaluate time period covers a different time than the first clock evaluate time period;
　a second plurality of resettable delay line segments that each delay the second monotone signal to generate a respective second plurality of delayed monotone signals, wherein resettable delay line segments between a resettable delay line segment associated with a minimum delay time and a resettable delay line segment associated with a maximum delay time are each associated with discretely increasing delay times; and
　an evaluate circuit, triggered by the clock, that uses the first plurality of delayed monotone signals or the second plurality of delayed monotone signals to detect a clock fault.

23. A method for detecting voltage tampering, comprising:
　providing a plurality of resettable delay line segments, wherein resettable delay line segments between a resettable delay line segment associated with a minimum delay time and a resettable delay line segment associated with a maximum delay time are each associated with discretely increasing delay times;
　providing a monotone signal during an evaluate time period;
　delaying the monotone signal using each of the plurality of resettable delay line segments to generate a respective plurality of delayed monotone signals each having either a one or a zero logic value; and using a clock to trigger an evaluate circuit that uses the plurality of delayed monotone signals to detect a voltage fault.

24. The method for detecting voltage tampering as defined in claim 23, further comprising:
resetting the resettable delay line segments during a reset time period, wherein the reset time period is prior to the evaluate time period.

25. The method for detecting voltage tampering as defined in claim 23, wherein using the clock to trigger the evaluate circuit comprises using a clock edge at an end of the evaluate time period to trigger the evaluate circuit.

26. The method for detecting voltage tampering as defined in claim 23, wherein the evaluate circuit determines whether the number of ones in the plurality of delayed monotone signals differs from a water level number by more than a predetermined threshold.

27. The method for detecting voltage tampering as defined in claim 26, wherein the water level number is determined based on delayed monotone signals from one or more previous evaluate time.

28. The method for detecting voltage tampering as defined in claim 23, wherein the plurality of resettable delay line segments comprises taps along a delay line.

29. The method for detecting voltage tampering as defined in claim 23, wherein the plurality of resettable delay line segments comprises parallel delay lines.

30. An apparatus for detecting voltage tampering, comprising:
means for providing a steady-state monotone signal during an evaluate time period;
means for delaying the monotone signal to generate a plurality of delayed monotone signals having discretely increasing delay times between a minimum delay time and a maximum delay time and each of the plurality of delayed monotone signals having either a one or a zero logic value;
means for evaluating that uses the plurality of delayed monotone signals to detect a voltage fault and
means for triggering the means for evaluating.

31. The apparatus for detecting voltage tampering as defined in claim 30, further comprising:
means for resetting the means for delaying the monotone signal during a reset time period, wherein the reset time period is prior to the evaluate time period.

32. The apparatus for detecting voltage tampering as defined in claim 30, wherein the means for triggering the means for evaluating uses a clock edge at an end of the evaluate time period to trigger the means for evaluating.

33. The apparatus for detecting voltage tampering as defined in claim 30, wherein the means for evaluating determines whether the number of ones in the plurality of delayed monotone signals differs from a water level number by more than a predetermined threshold.

34. The apparatus for detecting voltage tampering as defined in claim 33, wherein the water level number is determined based on delayed monotone signals from one or more previous evaluate time.

35. The apparatus for detecting voltage tampering as defined in claim 30, wherein the means for delaying the monotone signal includes taps along a delay line.

36. The apparatus for detecting voltage tampering as defined in claim 30, wherein the means for delaying the monotone signal includes parallel delay lines.

37. An apparatus for detecting voltage tampering, comprising:
a circuit that provides a monotone signal during an evaluate time period;
a plurality of resettable delay line segments that delay the monotone signal to generate a respective plurality of delayed monotone signals each having either a one or a zero logic value, wherein resettable delay line segments between a resettable delay line segment associated with a minimum delay time and a resettable delay line segment associated with a maximum delay time are each associated with discretely increasing delay times; and
an evaluate circuit, triggered by a clock, that uses the plurality of delayed monotone signals to detect a voltage fault.

38. The apparatus for detecting voltage tampering as defined in claim 37, wherein the resettable delay line segments are reset during a reset time period, wherein the reset time period is prior to the evaluate time period.

39. The apparatus for detecting voltage tampering as defined in claim 37, wherein the evaluate circuit is triggered by a clock edge at an end of the evaluate time period.

40. The apparatus for detecting voltage tampering as defined in claim 37, wherein the evaluate circuit determines whether the number of ones in the plurality of delayed monotone signals differs from a water level number by more than a predetermined threshold to detect the voltage fault.

41. The apparatus for detecting voltage tampering as defined in claim 40, wherein the water level number is determined based on delayed monotone signals from one or more previous evaluate time.

42. The apparatus for detecting voltage tampering as defined in claim 37, wherein the plurality of resettable delay line segments comprises taps along a delay line.

43. The apparatus for detecting voltage tampering as defined in claim 37, wherein the plurality of resettable delay line segments comprises parallel delay lines.

* * * * *